United States Patent [19]

Lewis

[11] Patent Number: 5,931,149
[45] Date of Patent: Aug. 3, 1999

[54] GRILL CART WITH TILTING TANK SUPPORT STRUT

[75] Inventor: Aron P. Lewis, Lanett, Ala.

[73] Assignee: W.C. Bradley Company, Columbus, Ga.

[21] Appl. No.: 09/134,211

[22] Filed: Aug. 14, 1998

[51] Int. Cl.[6] ........................................ F24C 3/00
[52] U.S. Cl. ............................................. 126/41 R
[58] Field of Search ................................. 126/41 R

[56] References Cited

U.S. PATENT DOCUMENTS

| | | | |
|---|---|---|---|
| 4,245,505 | 1/1981 | Baynes | 126/41 R |
| 4,413,515 | 11/1983 | Quinn | 126/41 R |
| 5,408,985 | 4/1995 | Giebel et al. | 126/41 R |
| 5,458,309 | 10/1995 | Craven et al. | 126/41 R |
| 5,873,355 | 2/1999 | Schlosser et al. | 126/41 R |

Primary Examiner—Carroll B. Dority
Attorney, Agent, or Firm—Thomas, Kayden Horstemeyer & Risley, LLP

[57] ABSTRACT

A grill cart with tilting tank support incorporates a first and second leg assembly with each of the leg assemblies including a front leg, a rear leg and an upper strut. The upper struts are mounted between upper ends of the front and rear legs. Additionally, the first leg assembly incorporates a tank support strut mounted between lower ends of the front and rear legs, with the tank support strut being rotatable between a receiving position configured for engaging the base of an LP gas tank and a mounted position configured for supporting an LP gas tank in a substantially upright orientation.

22 Claims, 2 Drawing Sheets

GRILL CART WITH TILTING TANK SUPPORT STRUT

FIELD OF THE INVENTION

The present invention relates generally to barbecue grills, and more particularly, to a movable strut for use with cart mounted barbecue grills which provides a support surface for a gas supply tank.

BACKGROUND OF THE INVENTION

Gas fired barbecue grills are commonly mounted on wheeled carts and are fueled by LP gas, such as liquid propane gas, from a tank mounted on the cart. Typically, an LP gas tank is mounted on a supporting strut or on a lower shelf of the cart, usually at one end or the other of the cart, thereby providing easy access for removing and replacing the tank. When a tank has been emptied, it is disconnected from a gas regulator hose assembly and removed from its mounted position upon the cart and then typically transported to a refilling station. After the tank has been refilled, it is then remounted beneath the grill and reconnected to the gas regulator hose assembly. The grill may then be utilized for barbecuing once again.

Many grills include a means for securing the LP gas tank to the barbecue grill cart. This is typically accomplished by seating the LP gas tank on a strut or on the bottom shelf assembly of the grill cart in any suitable manner, such as with mounting clips. Additionally, the top of the tank is then typically secured with one or more clips, springs, or other means, such as disclosed in U.S. Pat. No. 5,458,309 issued to Craven, Jr. et al. Other methods used for securing LP gas tanks to grill carts include encircling the LP gas tank with a belt or strap, as disclosed in U.S. Pat. No. 4,949,701 issued to Krosp et al, and U.S. Pat. No. 4,984,515 issued to Pivonka, respectively, and mounting the LP gas tank upon clips supported upon a leg of the grill cart, as disclosed in U.S. Pat. No. 5,076,252 issued to Schlosser et al.

Although the prior art teaches what appear to be relatively simple methods of securing LP gas tanks to barbecue grill carts, there are certain disadvantages in the prior art. These disadvantages include the necessity to lift the emptied tank vertically until it is clear of its support surface, and then move the tank horizontally away from the grill cart assembly. This operation typically takes place in relatively tight quarters due to the almost universal side shelves which are common on grill cart assemblies. Such grill carts then require the person wishing to replace the LP gas tank upon the grill cart to lift a filled gas tank vertically from the ground and then move the filled tank horizontally in order to place the tank upon either a support surface, such as a shelf or strut which is arranged below the grill assembly, or a clip assembly which is supported by a leg of the grill cart. Such tanks typically weigh approximately forty (40) pounds when filled.

Additionally, when replacing a tank which is mounted on a clip assembly, as described above, the bottom shelf or struts of the grill cart cannot be utilized to partially support the LP gas tank during the time in which the tank is being secured to the cart. Moreover, some of the prior art mounting clips engage both the bottom rim of the LP gas tank and the carrying handle arranged in the upper collar of the LP gas tank, thus necessitating lifting and securing of the tank without the benefit of using the tank handle.

Thus, the need exists in the art for a means to remove and replace a barbecue grill LP gas tank which reduces the amount of lifting of a filled LP gas tank that a person must undertake, while making the installation and removal simple and secure.

SUMMARY OF THE INVENTION

It is, therefore, one of the principal objects of the present invention to provide a barbecue grill which incorporates a movable support structure for mounting an LP gas tank, so as to provide a convenient method for removing and replacing the LP gas tank Another object of the present invention is to provide a support strut which is easily installed upon a barbecue grill cart and which is durable to provide a long service life.

Another object of the present invention is to provide a support strut which is incorporated into a wheeled barbecue grill cart utilizing the axles of the grill cart wheels.

A further object of the present invention is to provide a barbecue grill incorporating a support structure for conveniently removing and replacing an LP gas tank and which is adaptable for use on LP gas tanks and grill carts having varying configurations and for easily retrofitting existing grill carts.

These and other objects are attained by the present invention which relates to a barbecue grill incorporating a cart assembly with a tilting tank support strut which provides a support structure for mounting an LP gas tank to the barbecue grill cart. In a preferred embodiment, the cart assembly incorporates a rigid structure formed with wheeled or non-wheeled leg assemblies with each leg assembly including both a front and rear leg. The legs of each leg assembly are normally connected at their upper ends by an upper strut which engages and supports a grill assembly, and at their lower ends by a bottom shelf assembly. Additionally, the legs of the cart assembly are connected by a tank support strut which is mounted to the axles of the cart wheels or other connecting means and which is configured for receiving and mounting an LP gas tank.

When the LP gas tank has been emptied, it is disconnected from a gas regulator hose assembly and any associated securing means, and removed from its mounted position upon the tank support strut by tilting the tank outwardly utilizing the movable strut. A filled tank is then placed on its side adjacent the support strut which has been rotated to a receive position. The tank is then slid along the ground toward the strut until the lower rim of the tank engages the strut. Once so engaged, the support strut and the gas tank can be conveniently and simultaneously rotated to the mounted position so that the tank is arranged in a substantially upright orientation upon the strut. The securing means are reattached to the tank which is then reconnected to the gas regulator hose assembly, thereby providing a grill which is ready for use.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Figure 1:
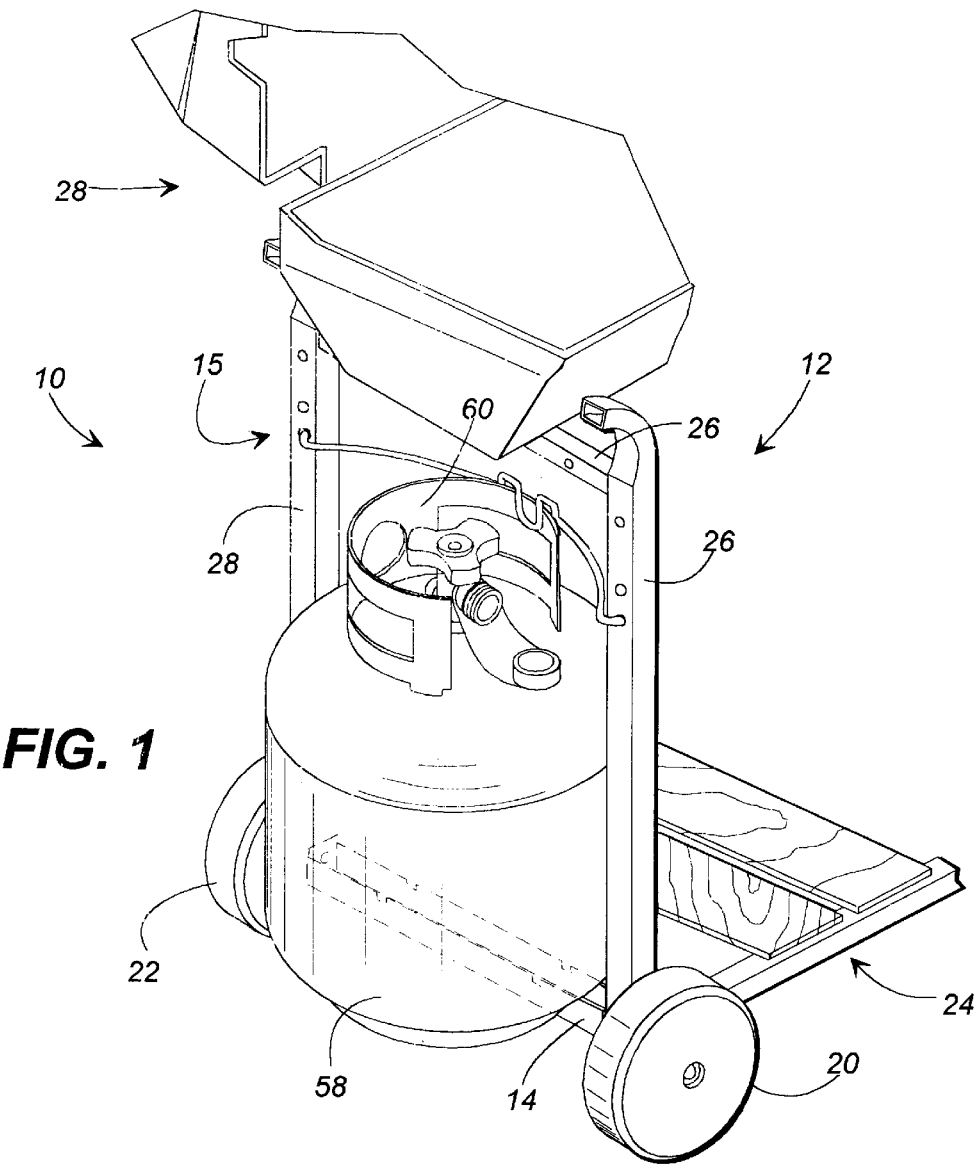
FIG. 1 is a partially cut-away, perspective view of a preferred embodiment of the present invention incorporated into a representative barbecue grill.

Reference will now be made in detail to the description of the invention as illustrated in the drawings with like numerals indicating like parts throughout the several views. FIG. 1 depicts a barbecue grill 10 incorporating a cart assembly 12 with which the tank support strut 14 of the present invention is utilized. In general, cart assembly 12 incorporates two leg assemblies, one of which is shown. Wheeled leg assembly 15 includes front leg 16 and rear leg 18 connected by tank support strut 14. Wheels 20 and 22 are connected to the cart legs, 16 and 18 respectively, to provide mobility to the grill, as is well known in the art. Bottom shelf assembly 24 and upper strut 26 are also connected to the cart legs to complete the cart assembly, thereby forming a rigid structure which serves to both support and transport grill assembly 28.

Figure 2:
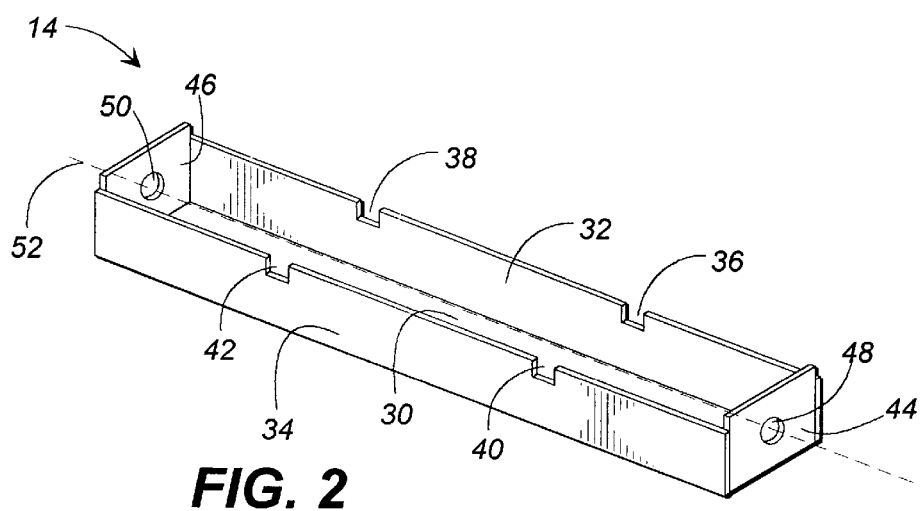
FIG. 2 is a perspective view of a preferred embodiment of the present invention.

As shown in FIGS. 1 and 2, a preferred embodiment of tank support strut 14 is configured as an elongated member, formed of steel or other suitable materials, with a base 30. Opposed side walls 32 and 34 extend upwardly from the periphery of the base with each side wall incorporating a pair of spaced notches 36 and 38, and 40 and 42. respectively. Opposed end walls 44 and 46 also extend upwardly from the periphery of the base with each end wall incorporating a bore, 48 and 50 respectively, which is generally centered along a longitudinal axis 52, shown in broken lines. Although shown incorporating rectangular side walls, end walls and base, strut 14 can be formed in various configurations.

Figure 3:
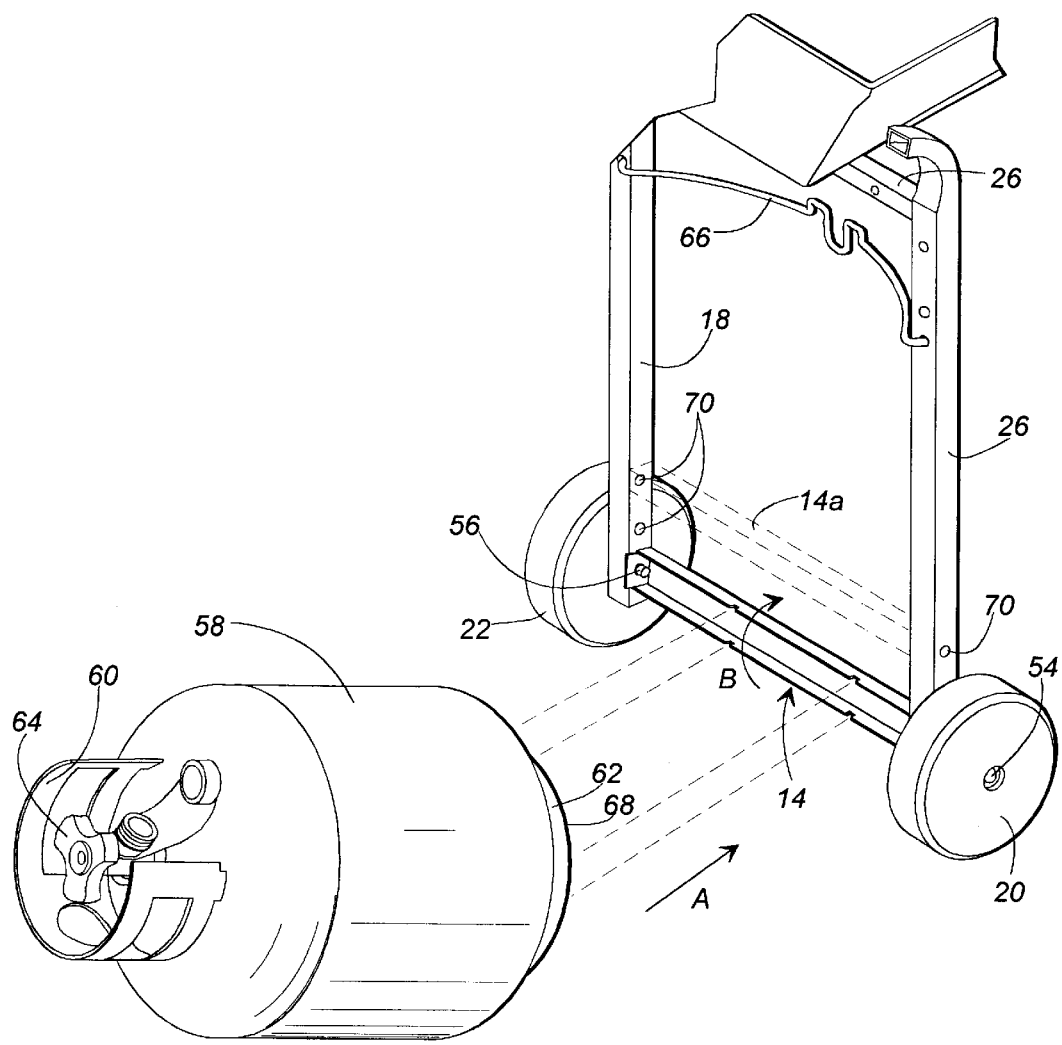
FIG. 3 is a partially cut-away, perspective view of a preferred embodiment of the present invention incorporated into a representative barbecue grill depicting a method of installing an LP gas tank onto the grill cart.

In the preferred embodiment of FIG. 3, strut 14 is rotatably mounted between legs 16 and 18 by means of axles 54 and 56 which are coaxial and which cooperate with bores 48 and 50, and which also rotatably mount wheels 20 and 22. Axles 54 and 56 are maintained in proper position in a conventional manner, such as by inserting a cotter pin (not shown) through a transverse bore (not shown) which is formed through the distal end of each axle, by engaging an externally threaded distal end of each axle with an internally threaded nut, etc, as is known in the art. While the present strut 14 is shown as coaxially mounted with the wheels, it is also contemplated by the present invention that the strut can be mounted at any level between the legs of the grill cart. For example, the strut (shown in FIG. 3 as strut 14a and represented in ghost) can utilize bores 70 and appropriate connecting means (not shown), such as bolts, pins, rods, etc, so as to support and be able to rotate for the mounting and removal of the gas tank.

LP gas tanks, such as gas tank 58 (FIGS. 1 and 3), typically incorporate a tank collar 60 which is normally welded to the upper portion of the gas tank, and a base 62 which is normally welded to the lower portion of the tank. The tank collar 60 is typically constructed in a circular shape so as to protect an LP gas valve 64 to which a gas regulator hose assembly (not shown) is attached for the purpose of conveying LP gas from the tank to a burner unit (not shown) which is mounted in the grill assembly. It is common practice that tank collar 60 also doubles as a carrying handle for transporting the tank to refilling stations, and for return to the barbecue grill cart assembly for reinstallation.

As shown in FIG. 3, LP gas tank 58 can be supported by the strut 14 both during and after installation. For instance, when the gas tank has been emptied, it is disconnected from the gas regulator hose assembly (not shown) and any associated securing means, such as tank holding wire 66, or other conventional means. The tank is then removed from its mounted position (FIG. 1) upon the tank support strut 14 by tilting the tank outwardly toward a horizontal position, facilitated by the rotation of the strut. A filled tank is then placed on its side adjacent the support strut which has been rotated to a receiving position (FIG. 3). The tank is then moved laterally in direction A toward the strut until the lower rim 68 of the base 62 of the tank engages the strut. Once so engaged the support strut and the gas tank can be conveniently and simultaneously rotated upwardly and inwardly toward the cart assembly in direction B to the mounted position so that the tank is arranged in a substantially upright orientation upon the strut (FIG. 1). The securing means, i.e. wire 66, is reattached to the tank in order to maintain the tank in a substantially upright position, thereby functioning as a locking mechanism for substantially maintaining the strut and tank in the mounted position. The tank is then reconnected to the gas regulator hose assembly.

In preferred embodiments, notches 36, 38, 40 and 42 are oriented in a planar arrangement for promoting engagement of the notches with the base of an LP gas tank, however, the notches can be formed in various sizes, shapes and configurations depending on the particular application. For example, the spacing of the notches along the side walls can be varied in a known manner so that the orientation of the gas tank relative to the strut can be adjusted. As shown in the preferred embodiment of FIG. 3, the notches are centered down the lengths of their respective side walls. This particular configuration results in a tank with a mounted position which centers the tank along the length as well as across the width of the strut.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

I claim:

1. An improved barbecue grill comprising:

a grill cart assembly;

an LP gas tank having a base removably mounted to said grill cart assembly; and a grill assembly mounted to said grill cart assembly;

said grill cart assembly having a first leg assembly, said first leg assembly having a front leg, a rear leg and a tank support strut mounted therebetween, said tank support strut having a first longitudinal axis and being capable of rotation about said first longitudinal axis between a receiving position and a mounted position, said tank support strut in said mounted position engaging said base of said LP gas tank such that said LP gas tank is arranged in a substantially upright orientation between said tank support strut and said grill assembly.

2. The barbecue grill of claim 1, wherein said front leg has a first wheel rotatably mounted thereto and said rear leg has a second wheel rotatably mounted thereto.

3. The barbecue grill of claim 2, wherein said first wheel has a first rotational axis and said second wheel has a second rotational axis and wherein said longitudinal axis of said tank support strut is coaxial with said first and second rotational axes.

4. The barbecue grill of claim 1, wherein said tank support strut has a base, opposed side walls extending from said base, and opposed end walls extending from said base, said end walls each having a bore extending therethrough and connecting means for rotatably mounting said tank support strut to said front and rear legs.

5. The barbecue grill of claim 4, wherein said side walls of said tank support strut have notches formed therein for engaging said base of said LP gas tank.

6. The barbecue grill of claim 5, wherein said side walls are further defined as a first side wall and a second side wall and wherein said notches are further defined as a pair of spaced notches formed along the upper edge of said first side wall and an opposing pair of spaced notches formed along the upper edge of said second side wall.

7. The barbecue grill of claim 5, wherein said notches are arranged in a substantially planar orientation.

8. An improved grill cart assembly for use with an LP gas tank having a base and a side wall, said grill cart assembly comprising:

a first and second leg assembly, each of said leg assemblies having a front leg, a rear leg and an upper strut, said front and rear legs each having upper and lower ends, each of said upper struts mounted between said upper ends of said front and rear legs, said first leg assembly having a tank support strut rotatably mounted between said lower ends of said front and rear legs, said tank support strut rotatable between a receiving position configured for engaging the base of an LP gas tank and a mounted position configured for supporting an LP gas tank in a substantially upright orientation.

9. The grill cart assembly of claim 8, wherein said first leg assembly has a first wheel rotatably mounted to said front leg and a second wheel rotatably mounted to said rear leg.

10. The grill cart assembly of claim 9, wherein said first wheel has a first rotational axis, said second wheel has a second rotational axis and said tank support strut has a third rotational axis, and wherein said first, second and third rotational axes are coaxial.

11. The grill cart assembly of claim 9, wherein said first wheel has a first axle and said second wheel has a second axle, and wherein said tank support strut is rotatably mounted to said first and second axles.

12. The grill cart assembly of claim 9, wherein said tank support strut has opposed first and second ends, said first end for engaging said front leg and said second end for engaging said rear leg.

13. The grill cart assembly of claim 9, wherein said tank support strut has a base, opposed side walls extending from said base, and first and second opposed end walls extending from said base, said first end wall having a first bore extending therethrough and said second end wall having a second bore extending therethrough and connecting means for rotatably mounting said tank support strut to said legs.

14. The grill cart assembly of claim 13, wherein said first wheel has a first axle and said second wheel has a second axle, and wherein said first axle extends through said first bore and said second axle extends through said second bore.

15. The grill cart assembly of claim 8, wherein said tank support strut has notches formed therein for engaging said base of said LP gas tank.

16. The grill cart assembly of claim 15, wherein said tank support strut has side walls and wherein said notches are formed in said side walls.

17. The grill cart assembly of claim 16, wherein said side walls are further defined as a first side wall and an opposed second side wall and wherein said notches are further defined as pair of spaced notches formed along the upper edge of said first side wall and an opposing pair of spaced notches formed along the upper edge of said second side wall.

18. The grill cart assembly of claim 15, wherein said notches are arranged in a substantially planar orientation.

19. The grill cart assembly of claim 8, further comprising a locking mechanism for substantially retaining said tank support strut in said mounted position.

20. The grill cart assembly of claim 19, wherein said locking mechanism is a tank wire.

21. In combination with a grill cart assembly for use with an LP gas tank, the grill cart assembly having a first and second leg assembly, each of said leg assemblies having a front leg and a rear leg, the improvement comprising:

a tank support strut rotatably mounted between the front and rear legs of the first leg assembly, said tank support strut rotatable about a first rotational axis between a receiving position configured for engaging an LP gas tank and a mounted position configured for supporting an LP gas tank in a substantially upright orientation.

22. In combination with a grill cart assembly for use with an LP gas tank, the grill cart assembly having a first and second leg assembly, each of said leg assemblies having a front leg and a rear leg, the front leg having a wheel rotatably mounted thereto about a first rotational axis, the rear leg having a wheel rotatably mounted thereto about a second rotational axis, the improvement comprising:

a tank support strut rotatably mounted between the front and rear legs of the first leg assembly, said tank support strut rotatable about a third rotational axis between a receiving position configured for engaging an LP gas tank and a mounted position configured for supporting an LP gas tank in a substantially upright orientation, such that said third rotational axis is coaxial with said first and second rotational axes.

* * * * *